United States Patent [19]

Undin et al.

[11] Patent Number: 4,526,068
[45] Date of Patent: Jul. 2, 1985

[54] TOOL FOR REMOVING INSULATION

[75] Inventors: Hans Undin, Åkersberga; Hans Wiener, Täby, both of Sweden

[73] Assignee: C. A. Weidmuller GmbH & Co., Detmold, Fed. Rep. of Germany

[21] Appl. No.: 407,475

[22] Filed: Aug. 12, 1982

[30] Foreign Application Priority Data

Aug. 28, 1981 [SE] Sweden ................................ 8105096

[51] Int. Cl.$^3$ ............................................. H02G 1/12
[52] U.S. Cl. ........................................ 81/9.4; 30/90.1
[58] Field of Search .................... 81/9.5 C, 9.5 R; 30/90.1, 90.6, 90.7, 90.8, 90.9

[56] References Cited

U.S. PATENT DOCUMENTS

| 2,538,453 | 1/1951 | Harkins | 30/90.9 |
| 2,649,654 | 8/1953 | Carta | 30/90.9 |
| 3,082,523 | 3/1963 | Modes | 30/90.9 X |
| 3,483,617 | 12/1969 | Krampe | 30/90.7 |
| 3,535,785 | 10/1970 | Matthews | 30/90.7 X |
| 3,881,249 | 5/1975 | Cox | 30/90.7 |
| 3,946,487 | 3/1976 | Bieganski | 30/90.9 X |
| 4,130,031 | 12/1978 | Weiner et al. | 81/9.5 R |
| 4,265,016 | 5/1981 | Ducret | 30/90.8 |

Primary Examiner—Jimmy C. Peters
Attorney, Agent, or Firm—Toren, McGeady and Stanger

[57] ABSTRACT

A tool for removing insulation from electrical conductors includes an apparatus body, a knife head defining a separate unit and attachable to the body, and a support for a treated conductor located at one end of the head. At least one insulation-cutting knife is arranged in the support and a holder stirrup is provided to press the cable against the support and the knife or knives.

14 Claims, 7 Drawing Figures

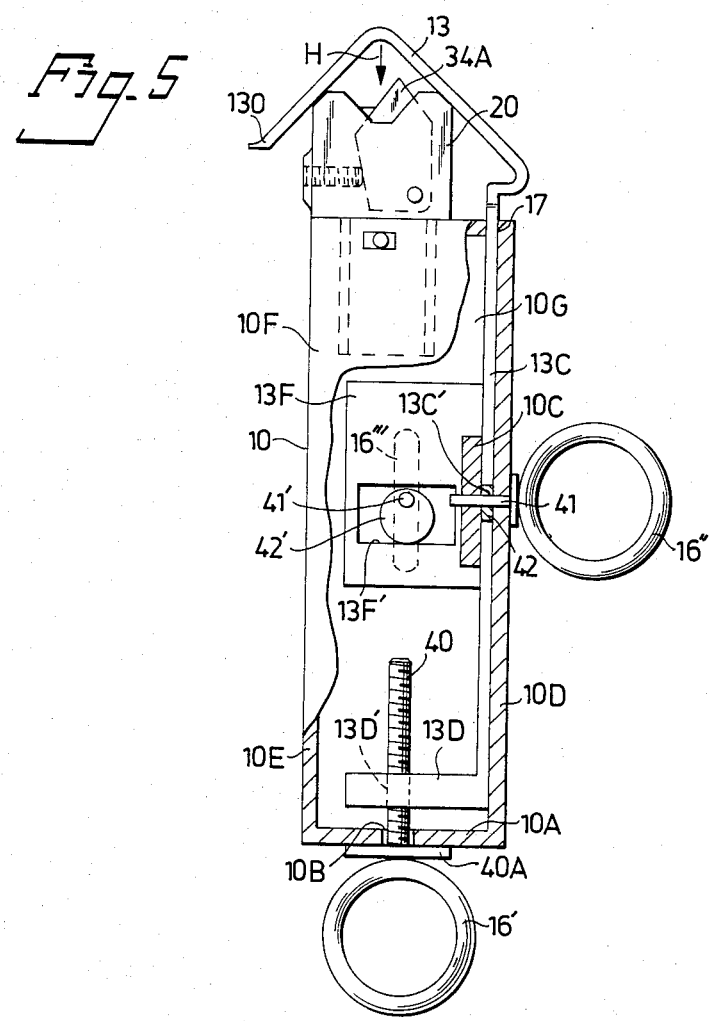
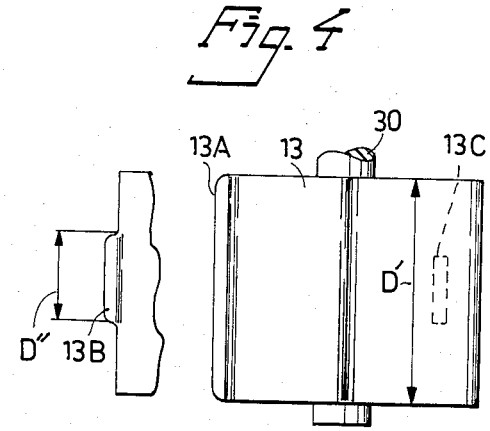
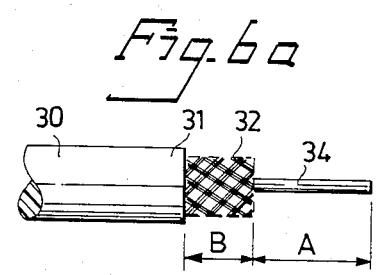
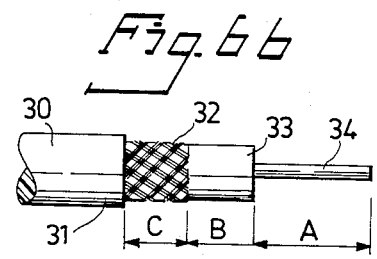

TOOL FOR REMOVING INSULATION

SUMMARY OF THE INVENTION

The present invention is directed to a so-called wire-stripper or a tool for removing insulation from electrical conductors having circular cross-section. The invention concerns a tool of the type having an apparatus body adapted to be held in the hand by a user and carrying at least one insulation-cutting knife, a holder stirrup for a treated conductor being attached to the apparatus body for rectilinear sliding movement in a tightening direction so as to firmly press the conductor against the knife. When the conductor is by the holder stirrup pressed against the insulation-cutting knife, the insulation is pierced at a single spot. By relative rotation of the tool and of the conductor around the axis of the conductor, the original incision made by the knife into the insulation is extended into a circular cut around the whole circumference of the conductor or, more precisely, of the insulation. A tool of this type is described e.g. in U.S. Pat. No. 3,881,249.

Further are known insulation stripping tools for coaxial cables which have two or three insulation-cutting knives arranged with predetermined spacing in the longitudinal direction of the cable to be treated and to a varying extent penetrating into the insulation of the coaxial cable in order to make incisions with varying depth, wherein one of the knives cuts through only the outer insulating layer and the other cuts through the outer insulating layer, the inner insulating layer and the outer conducting layer (shielding layer). If three knives are provided, an additional third knife located between the first and the second knife penetrates only through outer insulating layer and the shielding layer, but not through the inner insulating layer.

The primary object of the present invention is to improve the tool mentioned above, particularly to afford equally easy application when stripping single core cables as when stripping coaxial cables, in the last mentioned instance by making two or three incisions and allowing treatment even when the distance between the incisions is greater than the dimension of the apparatus body in the axial direction of the cable.

In accordance with the present invention, a tool for removing insulation from electrical conductors includes an apparatus body on which a holder stirrup for a treated cable is arranged for rectilinear sliding movement, and a knife head which is a unit separate from the body and is adapted for ready attachment thereto and removal therefrom. The knife head has to this purpose at one end an attachment means for non-rotatory temporary attachment to the apparatus body, defined by one part of a joint comprising two parts, and is on the opposite end provided with a support means for the cable including two opposite, spaced apart, elevated, straight, marginal portions or ridges flanking a straight central recess or depression, open at both ends and into which at least one insulating-cutting knife projects to a predetermined extent. The apparatus body is at its one end provided with the other part of the joint. The holder stirrup is connected to a guiding arm, and a rigid tightening means, controllable from the outside of the apparatus body, may be provided to cooperate with the guiding arm in order to unyieldably tighten the holder stirrup upon a conductor inserted into the tool.

The present invention presents the advantage that the stripping tool may be readily adapted for treating different kinds and different sizes of cables, as the need may be, and that even conductors with an insulation layer which is hard to penetrate may be firmly pressed against the insulation-cutting knife or knives.

The various features of novelty which characterize the invention are pointed out with particularity in the claims annexed and forming a part of this disclosure. For a better understanding of the invention, its operating advantages and specific objects attained by its use, reference should be made to the accompanying drawings and to the following descriptive matter in which there are illustrated and described preferred exemplary embodiments of the invention.

BRIEF DESCRIPTION OF THE DRAWINGS

In the drawings:

FIG. 4 is a plan view of the holder stirrup of FIGS. 1 and 2, two alternative embodiments of the free edge thereof being presented;

FIG. 5 is a front elevation view of a second embodiment of the tool according to the present invention; and FIGS. 6a and 6b show two modes of stripping the insulation from a coaxial cable, which also are practicable with a tool according to the present invention.

Parts with identical function are in all drawing figures denoted by identical reference numerals.

DETAIL DESCRIPTION OF THE INVENTION

Figure 1:
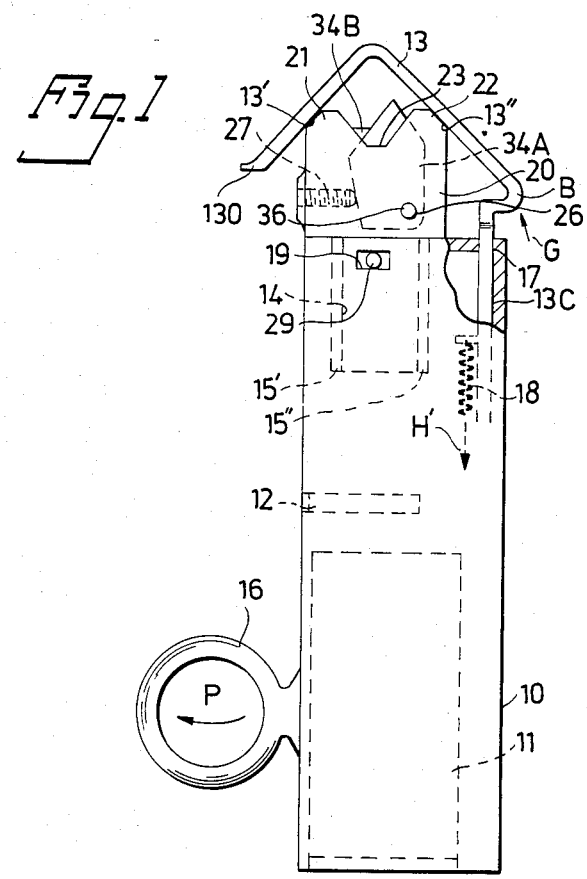
FIG. 1 is a front elevation view of a first embodiment of the tool according to the present invention.
Figure 2:
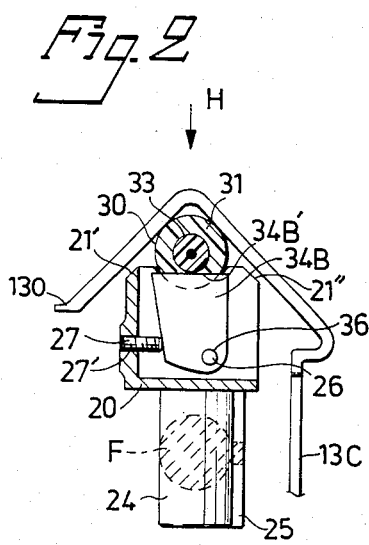
FIG. 2 is a front elevation view in the direction of arrow II in FIG. 3, and partly in section, of the knife head of FIG. 1, with a coaxial cable inserted.
Figure 3:
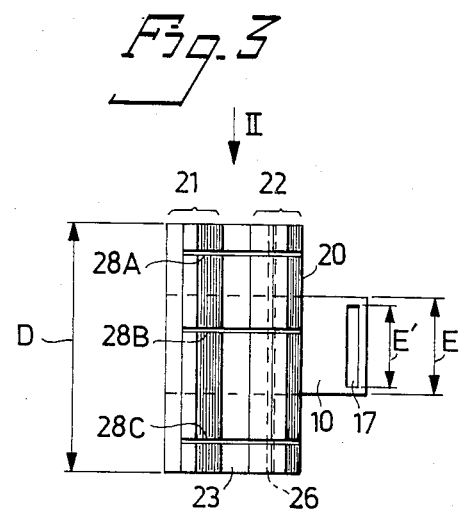
FIG. 3 is a plan view in the direction of arrow H in FIG. 2 of the knife head of FIGS. 1 and 2, the holder stirrup having been removed for clarity.

According to FIGS. 1 to 3, a roof-shaped holder stirrup 13 is slidably arranged in an apparatus body 10. The stirrup has a first portion located over said body, and a second portion which through an opening 17 enters into the interior of the apparatus body and is therein constantly subjected to a predetermined force in the sense of arrow H' by a tension spring 18. The arrows H, H' (FIGS. 2 and 5) indicate the direction in which holder stirrup 13 exercises its tightening function. For inserting a cable 30 (FIG. 2) into the tool for treatment, holder stirrup 13 is lifted by hand at B in the sense of arrow G and then again released.

According to the invention, a readily attachable and detachable knife head 20, defined by a separate unit, is mounted on the apparatus body 10. The knife head 20 is at one end (the lower end in the drawing) provided with an attachment means defined by a cylindrical guiding dowel 24 having a cross-section F and to which on one place of its periphery a straight guiding rail 25 is attached. In one end of the apparatus body 10 (the upper end in the drawing) is provided a cylindrical bore 14 for the reception of the guiding dowel 24 and two straight grooves 15', 15'' for receiving the guiding rail 25 are formed at two diametrically opposite locations on the circumference of bore 14 (i.e. differing by 180°). The knife head 20 can thus be connected to the apparatus body in two positions, differing by 180°, and is retained by a lug 29 which may be e.g. spring-loaded from the inside of the guiding dowel and which is engaged in a slot 19 provided in the apparatus body (another such a slot is provided in the other wall of the apparatus body, which is not visible in the drawing). Guiding dowel 24 and bore 14 define a readily detachable, non-rotatory joint having two cooperating parts.

The knife head 20 is at the end opposite to the dowel 24 provided with a support means for the treated cable 30. The support means includes two oppositely spaced apart straight, elevated marginal parts or ridges 21, 22 between which a straight recess or depression 23 is located. The ridges 21, 22 and the recess 23 extend rectilinearily in the direction of an inserted conductor, i.e. at right angles to the plane of the drawing of FIGS. 1 and 2, as will be best observed in FIG. 3. The recess is open at its both ends to accomodate an arbitrary length of the cable between the marginal parts.

One, two, or three straight slots 28A, 28B, 28C, each for the accomodation of one insulation-cutting knife such as 34A or 34B are provided in the knife head 20. A knife head with one slot and one knife serves for stripping single core cables, and a knife head with two slots and two knives serve for stripping a coaxial cable in the mode shown in FIG. 6a. In FIG. 6a a coaxial cable 30 is shown which has an outer insulation layer 31, a conductive shielding layer 32 located thereunder, an inner insulating layer 33 (visible only in FIG. 6b) located under the shielding layer, and a conductive central core 34. Upon stripping the insulation, all layers (with the exception of the conductive core, of course) are severed by a first cut at the distance A from the end of the cable, whereas the outer insulation layer 31 only is severed by a second cut at the distance A+B, whereafter all severed portions are removed from the cable. Such treatment may be accomplished by the tool according to the invention e.g. with the aid of a knife head 20 according to FIG. 3 by letting one of the slots 28A, 28B or 28C be "unloaded" (i.e. not inserting any knife therein), or by a similar knife head having only two slots.

A knife head with three slots is primarily intended for stripping according to FIG. 6b. A first cut at the distance A ends, as previously, adjacent the conductive core 34, a second cut at the distance A+B ends before the inner insulating layer 33, and a third cut at the distance A+B+C ends before the shielding layer 32 (as the case was with the cut at the distance A+B in FIG. 6a). In this mode, all three slots 28A, 28B, 28C in the knife head 20 are loaded with insulation-cutting knives.

It will be now understood that different tasks in removing insulation may be solved by differently loading one and the same knife head 20. However, it appears to be more practical to replace the whole knife head, and this is indicated in particular when now the one, now the other mode has to be carried out, and/or if in anyone mode several different values of the spacings A, B and possibly C are required.

A knife head for a single insulation-cutting knife, i.e. a head having a single slot, does not need to project on any place beyond the apparatus body 10 shaped as a relatively slim hand-grip or handle. However, when stripping coaxial cables, and particularly when doing so in the mode according to FIG. 6b, a longer stripping path (A+B+C) is sometimes required than what corresponds to the normal dimensions (so to the breadth E, FIG. 3) of the apparatus body. With a reference to FIG. 3 it will be, however, readily understood that a separate knife head according to the present invention readily may have a dimension D in the direction of an inserted cable which surpasses the breadth E of the apparatus body 10 either on one end, or on both ends (as shown in the drawing), thus enabling to obtain any reasonable stripping length on the cable.

In the apparatus body may conveniently be provided a storing place 11 for a replacement knife head and/or a storing place 12 for one or more replacement knives. Alternatively, the apparatus body may be made considerably shorter than what is shown in FIG. 1. Preferably, an eyelet 16 is arranged on the apparatus body, e.g. at the lower end thereof, through which the user can pass a finger of his hand to rotate the tool in the sense of arrow P around an inserted cable in order to extend the incision or incisions made by the cutting knife or knives along the whole periphery of the cable.

In FIG. 2 is shown a section through the knife head 20 of FIG. 1 along the plane of slot 28A (FIG. 3) and as seen in the direction of arrow II in FIG. 3. The insulation-cutting knife 34B, inserted into the slot 28A, has a straight cutting edge 34B' which extends substantially at right angles to the tightening direction H of the holder stirrup 13. Knife 34B is provided to make the incision at the distance A+B in FIG. 6a or either at A+B or at A+B+C in FIG. 6b. At the end which is remote from the cutting edge 34B' is a mounting opening 36 arranged in the knife 34B through which a retaining pin 26 passes which is readily dismountably anchored in the knife head 20. Also the other insulation-cutting knives have such an opening on corresponding locations, so e.g. also knife 34A of FIG. 1, which presents a sharp point located closer to the one marginal part 22 than to the other marginal part 21.

In the knife head 20 is at a location above the pin 26, i.e. closer to the cutting edge of an inserted knive, a tapped hole 27' provided adjacent each slot 28A, 28B, 28C, and a setting screw 27 is screwed-in into each such hole. Upon tightening of the setting screw is the respective knife rotated, owing to which the cutting edge thereof will project somewhat more from the straight recess in the support means, and consequently make a deeper incision into a treated cable. Screwing back has the opposite effect, so that each insulation-cutting knife may be precisely adjusted with the aid of a setting screw such as 27.

The first portion of the holder stirrup 13 has essentially the same breadth D' (FIG. 4) as the knife head 20 (breadth D in FIG. 3) or, more precisely, as the largest knife head appertaining to one tool. The second portion of the holder stirrup is defined by a guiding arm 13C which has of course always a breadth E' corresponding to the dimensions of the opening 17 through which the guiding arm penetrates into the apparatus body.

Preferably, the upper outer faces 21', 21" of the knife head 20 are tapered configuratively with the adjacent inner faces 13', 13" of the roof-shaped holder stirrup 13. Owing to this, the knife head is in the rest position according to FIG. 1 effectively pressed against the apparatus body, and the same applies in the working position according to FIG. 2 where the pressure is transmitted via the inserted cable 30, so that fixing means 19, 29, mentioned earlier, also may be omitted. The configurative shaping has also the purpose to allow the holder stirrup to closely approach the knife head 20 for treatment of small diameter cables.

The portions of the insulation which have been severed by circular cuts must often be slit longitudinally to enable easy removal. To this purpose, the free edge 13A of the holder stirrup 13 may conveniently in cross-section or in side-elevation taper to an outwardly turned point, as shown at 130 in FIGS. 1, 2 and 5, without however narrowing into a point in plan view, but defining there a straight line either along the whole breadth D' of the free edge, or at least along a portion 13B, with a breadth D" thereof, as shown in FIG. 4.

In the embodiment according to FIG. 5 is, the apparatus body 10 is defined by a housing having four side walls 10D, 10E, 10F and 10G and a bottom wall 10A. The guiding arm 13C of the holder stirrup 13 is in the interior of the housing slidably guided between the inner face of side wall 10D and an opposite partition 10C. In FIG. 5 are at the same time shown three different solutions of how holder stirrup 13 may in a non-yielding, i.e. non-resilient manner (in contrast to the tension spring 18 of FIG. 1) act on an inserted conductor. It will be however understood that in practice always only one of the solutions will be applied at one time.

According to a first alternative, a cross-arm 13D is rigidly attached to the lower end of the guiding arm 13C and a tapped hole 13D' is arranged therein. A tightening screw 40, freely passing through an unthreaded hole 10B in the bottom wall 10A of the apparatus body, may be screwed into the hole. Tightening screw 40 is outside the apparatus body 10 provided with a flange or collar 40A with larger diameter than opening 10B, and is further provided with an actuating means 16' which is similar to the eyelet 16 of FIG. 1 and which may be in the same manner slipped over a finger. When the conductor to be stripped-off has been inserted into the tool, i.e. between the knife 34A and the holder stirrup 13, the screw 10 is tightened till the conductor completely rests on the support means and the insulation cutting knife or knives have to a predetermined depth penetrated into the insulation layer of the condutor.

According to a second alternative, there are openings for rotatory accomodation of a pin 41 provided in the side wall 10D and in the partition 10C, and in the guiding arm 13C is arranged a slot 13C' (similar to the slot 13F', to be described later). An eccentric cam 42 is non-rotatably mounted on the pin 41 and is rotatably accomodated in the slot 13C'. The pin 41 is at the outside of the apparatus body 10 provided with an actuating means 16" which is identical with the actuating means 16'. By rotation of the eccentric cam 42 through maximally 180° is the holder stirrup 13 tightened as in the preceding instance.

The third alternative differs from the second one in that the pin 41' with the eccentric cam 42' is rotatably mounted in the two side walls 10G and 10F of the housing, which disposition demands that the window 13F' for accomodating the cam must be arranged in a plate 13F which is parallel with side walls 10F and 10G and is rigidly attached to the guiding arm 13C. This solution has the advantage over the second solution that the other two side walls 10D and 10E, and thereby the whole apparatus body 10, may be rather narrow. The tightening screw 40 and the eccentric cam 42, 42' are made self-retaining in accordance with known principles. The edges of the eccentric cam 42, 42' and/or of the slot 13C', 13F', engaging one with another, may be provided with friction promoting means such as shallow grooves or the like. It will be recognised that the force actuating the tightening means in the three alternatives described, and generated by the hand of the user, may be at will modified, i.e. in particular augmented, by suitably selecting either the pitch of the screw 40, or the eccentricity and/or circumferential shape of the cam 42, 42'.

Tightening screw 40, and eccentric cam 42 or 42', define a first element of a rigid tightening means, and tapped hole 13D' and window 13C' or 13F' define a second element, co-operating with the first one.

The circular shape of the eccentric cam shown in the drawing has to be considered as an example only.

The alternatives shown in FIG. 5 are particularly suitable for treating conductors with an insulation having an insulation layer which is difficult to penetrate (tough, thick).

Several other modifications are possible within the scope of the invention. The knife head may be e.g. attached to the apparatus body with the aid of a dove tail joint and slipped on from the side, and the support means and/or the holder stirrup may have some other shape than what is shown in the drawings. The guiding rail 25 can be replaced e.g. by a guiding pin, or a non-rotatory mounting of the knife head 20 on the apparatus body 10 with two possible relative positions may be obtained in some other way, e.g. by a non-circular, such as rectangular or the like, cross-section of the dowel 24 and of the opening 14. The knife head 20 and the apparatus body 10 may also be adapted for being connected in a single relative position, e.g. by omitting one of the two longitudinal grooves 15, 15' formed in the bore 14.

We claim:

1. A tool for removing insulation from electrical conductors with circular cross-section, comprising in combination:
   an apparatus body adapted to be held in the hand by a user and provided at one end with a first part of a non-rotatory, readily dismountable joint comprising two parts;
   a knife head replaceably mounted on said body, said knife head provided at one end with the second part of said joint and on the opposite end with a support means for a treated electrical conductor, said support means including two oppositely spaced apart, elevated, straight marginal portions and a straight central recess enclosed between them and open at both ends, so that the conductor can be placed in said recess between said marginal portions;
   at least one insulation-cutting knife having a cutting edge and a mounting hole for a retaining pin, and being arranged in said support means so as to a predetermined extent project into said recess;
   a holder stirrup having a first portion extending over said support means when said knife head is mounted on said body and having a shape allowing relative rotation of the tool and an inserted conductor, and a second portion by which the stirrup is attached to said body for rectilinear movement in a tightening direction so as to firmly press the cable onto said support means and said at least one knife,
   wherein for each said knife there is provided in said knife head a setting means for the exact position-adjustment of said cutting edge, said setting means being defined by a setting screw screwed into a tapped hole arranged in said knife head closer to said cutting edge of said knife than said mounting hole.

2. A tool for removing insulation from electrical conductors with circular cross-section, comprising in combination:
   an apparatus body adapted to be held in the hand by a user and provided at one end with a first part of a non-rotatory, readily dismountable joint comprising two parts;

a knife head replaceably mounted on said body, said knife head provided at one end with the second part of said joint and on the opposite end with a support means for a treated electrical conductor, said support means including two oppositely spaced apart, elevated, straight marginal portions and a straight central recess enclosed between them and open at both ends, so that the conductor can be placed in said recess between said marginal portions;

at least one insulation-cutting knife having a cutting edge and being arranged in said support means so as to a pre-extent project into said recess;

a holder stirrup having a first portion extending over said support means when said knife head is mounted on said body and having a shape allowing relative rotation of the tool and an inserted conductor, and a second portion by which the stirrup is attached to said body for rectilinear movement in a tightening direction so as to firmly press the cable onto said support means and said at least one knife, wherein said holder stirrup is roof-shaped and said knife head is on its side closely adjacent said holder stirrup configuratively shaped in order to allow close approach of said holder stirrup to said support means.

3. A tool for stripping insulation from electrical conductors with circular cross-section by at least one circular cut transversely to the longitudinal direction of the conductor, comprising in combination:

a holder stirrup having a sidewardly bent first portion for engaging, in an operative position of said stirrup, a treated conductor, and a straight, elongated second portion connected to said first portion;

a straight, elongated body member adapted to be held in the hand by a user and having an upper end, a lower end a side wall means having an outer face and an inner face and extending between said upper and said lower ends, a bottom wall means at said lower end defining in said body member an internal space for accommodating said second portion near said inner face, and readily dismountable joint means at said upper end, said joint means comprising first and second parts;

operative means in said internal space and engaging said second portion so as to allow moving said stirrup slidingly into said operative position and retaining it therein;

a knife head member separable from said body member, said knife head member having an upper end, a lower end, mounting means for cutting knife means, support means for the treated conductor at the upper end comprising two parallel, spacedly opposite, straight, elevated ridges flanking a straight furrow open at both ends so that a conductor of arbitrary length can be inserted between said ridges, and, at said lower end, said second part of said joint adapted to receive said first part in order to mount said knife head member on said body member in an axially immovable, readily releasable manner relative to said body member and in a defined rotational position;

locking means acting on said knife head member in order to releasably hold it in said defined position;

an insulation-cutting knife means mountable in said mounting means and comprising at least one insulation cutting knife having an operative portion projecting into said furrow.

4. A tool, as set forth in claim 3, wherein said body member has at its upper end an upper end face, said second part defined by a guiding dowel having a non-circular cross-sectional shape, and said first part defined by a recess in said end face and having a cross-sectional shape matching the shape of said dowel.

5. A tool, as set forth in claim 3, wherein said locking means is defined by a spring-loaded lug and a slot for receiving said lug.

6. A tool, as set forth in claim 4, wherein said cross-sectional shapes allow mounting of said knife head member selectively in one of two defined rotational positions differing by 180°.

7. A tool, as set forth in claim 3, for the treatment of coaxial cables, wherein said insulation-cutting knife means is defined by at least two knife members spaced apart in the direction of said furrow and said ridges and in the longitudinal direction of the treated conductor each said knife member extending to a different, predetermined extent into said furrow and the conductor.

8. A tool, as set forth in claim 7, wherein said knife head member protrudes over said body member in the direction of said furrow and of said ridges.

9. A tool, as set forth in claim 3, wherein said mounting means is defined by a straight slot for each knife member extending at right angles to the direction of said furrow and the conductor, a retaining pin traversing all slots mounted in said knife head member, each knife member provided, spacedly from its operative portion, with a mounting hole for said pin so that said knife member can be swung about said pin for setting purposes, and a setting screw sidewardly screwed into said knife head member so as to position the respective knife member spacedly from said mounting hole.

10. A tool, as set forth in claim 3, wherein, in at least one knife member, said operative portion is defined by a straight cutting edge extending substantially at right angles to the direction of said sliding movement.

11. A tool, as set forth in claim 3, wherein, in at least one knife member, said operative portion is defined by a sharp cutting point located closer to one ridge than to the other.

12. A tool, as set forth in claim 3, wherein said operative means is defined by a slot, a cam member rotarily accommodated in said slot, and a pin which non-rotarily mounts said cam member and which rotarily passes in an opening through said side wall means and outside the body member is provided with an actuating means.

13. A tool, as set forth in claim 3, wherein said first portion has a shape allowing relative rotation of the tool and the conductor and extends over said knife, and said second portion is defined by a guiding arm with the aid of which the stirrup is inserted into said body for rectilinear movement in a tightening direction so as to firmly press the conductor onto said knife or knives, said tool further comprising rigid tightening means adapted to unyieldably move said stirrup in said tightening direction, said tightening means defined by a first element movably mounted in at least one of said walls, and a second element cooperating inside said body with the first element and rigidly connected to said guiding arm, wherein said first element is a tightening screw extending in said tightening direction and freely passing through a hole in said bottom wall, and said second element is defined by a tapped hole provided in a cross-arm fastened to said guiding arm to accommodate said screw.

14. A tool, as set forth in claim 3, wherein said first portion is shaped so as to allow relative rotation of the tool and the conductor and extends over said knife, and said second portion is defined by a straight, longitudinal guiding arm with the aid of which said holder stirrup is slidably mounted in said apparatus body for rectilinear movement into said operative position so as to press firmly said cable onto said knife or knives, and wherein said operative means is adapted to selectively allow said movement and to unyieldably lock said stirrup in said operative position, said operative means comprising an actuating member which in an opening rotarily passes through said wall means and means rigidly connected to said guiding arm and cooperating with said actuating member in order to accomplish said movement and locking functions.

* * * * *